United States Patent [19]

Herdtner et al.

[11] Patent Number: 4,992,036
[45] Date of Patent: Feb. 12, 1991

[54] MOLD CLAMPING SYSTEM

[75] Inventors: William D. Herdtner, Amelia; Frederick F. Van Keuren, III, Batavia, both of Ohio

[73] Assignee: Cincinnati Milacron Inc., Cincinnati, Ohio

[21] Appl. No.: 473,043

[22] Filed: Jan. 31, 1990

[51] Int. Cl.$^5$ .................. B29C 45/67; B29C 45/68
[52] U.S. Cl. .................. 425/135; 425/150; 425/595; 425/450.1; 425/451.9
[58] Field of Search .............. 425/135, 150, 450.1, 425/451.9, 589, 590, 594, 595

[56] References Cited

U.S. PATENT DOCUMENTS

| | | | |
|---|---|---|---|
| 2,259,781 | 10/1941 | Shaw et al. | 425/589 |
| 2,666,230 | 1/1954 | Sherman | 425/589 |
| 2,671,247 | 3/1954 | Lester | 425/589 |
| 2,923,973 | 2/1960 | Ninneman | 425/590 |
| 3,156,014 | 11/1964 | Wenger | 425/589 |
| 3,771,935 | 11/1973 | Loichen | 425/595 |
| 4,354,811 | 10/1982 | Marmo | 425/150 |
| 4,439,133 | 3/1984 | Rees et al. | 425/589 |
| 4,714,579 | 12/1987 | Baden et al. | 425/590 |
| 4,917,840 | 4/1990 | Harada et al. | 425/590 |

Primary Examiner—Willard Hoag
Attorney, Agent, or Firm—Nies, Kurz, Bergert & Tamburro

[57] ABSTRACT

A mold clamping system for molding articles by injecting a flowable material into a mold cavity defined by a pair of movable mold sections. The machine includes an hydraulically operated mold clamping system, and a separate hydraulic fluid reservoir for the hydraulic cylinder that provides the clamping force for holding together the mold sections during high pressure injection of molding material into the mold. The separate reservoir along with a lower, main reservoir permits a reduction of the overall height of the molding machine. The clamping system reservoir includes a level sensor, and a comparator is provided to compare the actual fluid level within the clamping system reservoir with the expected level based upon the position of the clamping ram, as sensed by a position transducer, to control the operation of an overflow valve when the actual fluid level is greater than the expected level.

8 Claims, 2 Drawing Sheets

MOLD CLAMPING SYSTEM

BACKGROUND OF THE INVENTION

1. Field of the Invention

The present invention relates to molding machines for molding articles by injecting molding material under pressure into an article-defining mold cavity defined by separated and cooperating mold portions. More particularly, the invention relates to a molding machine that incorporates hydraulically operated drive arrangements for performing various of the functions of the machine, and that includes an hydraulic clamping cylinder for holding the mold portions together during material injection, the hydraulic fluid for which clamping cylinder is maintained in a separate reservoir that is spaced from and in communication with a main hydraulic reservoir.

2. Description of the Related Art

In machines for molding parts from a flowable material that is introduced into a mold cavity under pressure, particularly plastics injection molding machines, where the various structures for performing rotary and translatory movements are hydraulically operated, the normal practice is to provide a main reservoir for the hydraulic fluid, and to position that main reservoir above a large capacity hydralic cylinder that provides a clamping force for holding together mold portions during the injection of the molding material. However, as the parts to be molded increase in size, the clamping cylinder must, of necessity, increase as well in order to provide the necessary additional clamping force to hold together the larger mold portions during the material injection step. During injection, the material to be molded is injected into the mold cavity under very high pressure, which results in very high forces within the mold cavity and that act on the respective mold portions to tend to separate them. Accordingly, very high clamping forces are necessary in order to overcome the higher separation forces that exist during the injection operation.

As the molding machines increase in clamping capacity, the hydraulic cylinders for providing the necessary clamping force also increase in size, which, in turn, requires an hydraulic reservoir of correspondingly greater size. Consequently, as the machine size increases, along with the size of the hydraulic reservoir, the machines attain a height of such a magnitude that the machines cannot be accommodated in relatively low-ceilinged structures, thereby requiring expensive high bay facilities in order to accommodate such machines.

Accordingly, it is an object of the present invention to provide an improved, high clamping force capacity molding machine wherein the overall height of the machine is maintained at a reasonably low level.

It is a further object of the present invention to provide a molding machine having a separate reservoir for the hydraulic fluid that is used to operate the clamping cylinder.

It is a still further object of the present invention to provide a molding machine in which the hydraulic fluid for operating the clamping system is contained in a reservoir that includes overflow protection to permit overflow to occur into a main reservoir that is separate from the clamping system reservoir.

SUMMARY OF THE INVENTION

Briefly stated, in accordance with one aspect of the present invention, there is provided a molding machine for molding articles from materials that are injected under pressure into a mold cavity defined by a pair of cooperating mold portions. The molding machine includes hydraulically operated drives for rotary and translatory motion, and includes an hydraulically operated clamping arrangement for providing a high clamping force on the mold portions to hold them tightly together during high pressure injection of molding material.

The mold clamping arrangement includes an hydraulic cylinder and a ram movable longitudinally within the cylinder, an end of the ram extending outwardly of the cylinder and connected with a movable mold portion. A main hydraulic fluid reservoir is provided for containing hydraulic fluid used in the various portions of the machine operating system. Additionally, a clamp cylinder reservoir is provided and is positioned at a higher elevation relative to and is connected by a connecting conduit with the main reservoir. The connecting conduit permits excess hydraulic fluid to flow from the clamping system reservoir to the main reservoir in order to avoid overflow of the clamping system reservoir. The capacity of the clamping system reservoir is adapted only to provide sufficient hydraulic fluid for the clamp cylinder, and because of its smaller size as compared with a correspondingly positioned main reservoir, it provides a molding machine having a lower overall height, to permit the machine to be housed in buildings having lower ceilings.

DESCRIPTION OF THE PREFERRED EMBODIMENTS

Figure 1:
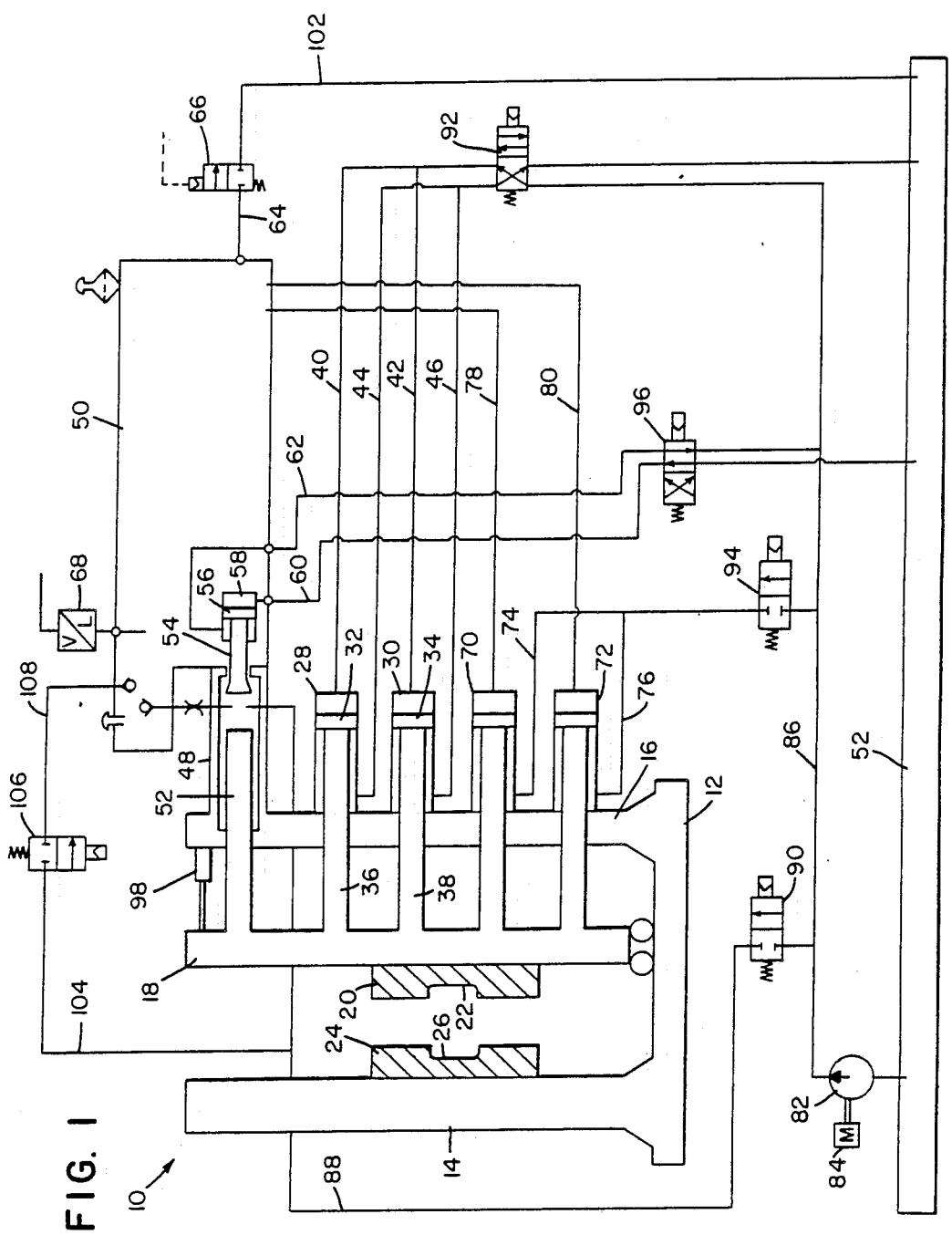
FIG. 1 is a schematic view of the mold clamping system of a plastics injection molding machine in accordance with the present invention.

Referring now to the drawings, and particularly to FIG. 1 thereof, there is shown a mold clamping system 10 of a type that is commonly found in plastics injection molding machines. Clamping system 10 includes a base 12, a first stationary platen 14, and a second stationary platen 16. First and second stationary platens 14, 16 are substantially parallel to and are spaced from each other a distance sufficient to permit the positioning therebetween of a pair of mold sections that are capable of being moved toward and away from each other, as will be hereinafter described. Positioned between stationary platens 14 and 16 is a movable platen 18 that faces and is movable toward and away from first stationary platen 14. Movable platen 18 carries a first mold section 20 that includes a first mold cavity section 22, and first stationary platen 14 carries a second mold section 24 that includes a second mold cavity section 26. The respective mold cavity sections 22 and 26 together define a closed mold cavity when mold sections 20 and 24 are brought together into contacting relationship, the mold cavity serving to define the shape of a molded article that is formed when flowable material is forcibly injected into the mold cavity during a molding cycle.

Although movable platen 18 is shown as incorporating wheels that ride along base 12, it is not essential that such a wheeled supported arrangement by provided for the movable platen. A wheeled supporting arrangement has been found to be desirable in molding machines adapted to mold large parts and requiring large clamping forces, on the order of about 3000 tons or so of clamping force, or greater, because of the weight of the movable platen and the associated mold section, which otherwise would be cantilevered from second stationary platen 16. Another common way to support a movable platen is by means of guide rods tht extend between the stationary platens, and on which the movable platen is slidably carried, as will be appreciated by those skilled in the art.

Ordinarily, first and second stationary platens 14, 16, as well as movable platen 18, are of generally rectangular configuration. A pair of hydrauically operated traverse cylinders 28, 30 is provided for moving the movable platen toward and away from first stationary platen 14. As shown traverse cylinders 28, 30 are carried by second stationary platen 16, and they are preferably disposed in diagonal relationship relative to rectangular movable platen 18, to more evenly distribute the actuation forces. Pistons 32, 34 are movable within cylinders 28, 30, respectively, and each of pistons 32, 34 includes a respective piston rod 36, 38 that extends to and connects with movabel platen 18. Thus, the introduction of pressurized hydraulic fluid into the head end of traverse cylinders 28, 30 through respective head end conduits 40, 42 causes movable platen 18 to be shifted toward the left, as viewed in FIG. 1, and, correspondingly, the introduction of pressurized hydraulic fluid into the rod ends of the respective cylinders, through respective rod end conduits 44, 46, causes movable platen 18 to move from left to right, as viewed in FIG. 1.

The clamping cylinder 48 is supported by second stationary platen 16 and provides very high clamping forces acting between first stationary platen 14 and movabel platen 18. High clamping forces are necessary when parts having large cross-sectional areas, in a plane transverse to the line of movement of movable platen 18, are molded, because the high pressures of the injected material within the mold cavity result in correspondingly high forces acting on the respective mold sections to urge them apart during the injection operation.

Although shown diagrammatically in FIG. 1 as of relatively small size, in actual practice mold clamping cylinder 48 is quite large, and for a molding machine having a clamping capacity of about 300 tons the clamping cylinder can have a diameter of about 53 inches, and can have an axial length of about 78 inches, in orderd to accommodate the lateral movement of movable platen 18, which can, of course, be any desired distance, depending upon the size of the parts being molded.

Connected with clamp cylinder 48 is a clamp cylinder hydraulic reservoir 50 for containing the large volume of hydraulic fluid that fills clamp cylinder 48 when the ram 52 that is slidably positioned in clamp cylinder 48 is in its fully extended position with mold sections 20, 24 in contacting relationship. Clamp cylinder reservoir 50 is adapated to contain principally only that hydraulic fluid that flows into and out of clamping cylinder 48, and other hydraulically operated portions of the machine (not shown) derive their operating hydraulic fluid from a main reservoir 52.

Positioned within claim cylinder reservoir 50 is a prefill valve 54 that selectively opens and closes a large area flow passageway to permit rapid flow of hydraulic fluid between clamp cylinder 48 and clamp cylinder reservoir 50. Prefill valve 54 is preferably hydraulically operated through a piston 56 that is movable carried within a cylinder 58 that is housed within clamp cylinder reservoir 50. A conduit 60 extends from the head end of cylinder 58 and a conduit 62 extends from the rod end thereof for conveying hydraulic fluid to open and close prefill valve 54, to control flow therethrough.

Clamp cylinder reservoir 50 also includes an outlet conduit 64 for conveying excess hydrauic fluid from clamp cylinder reservoir 50 to main reservoir 52. An outlet flow control valve 66 is provided in outlet conduit 64 for controlling flow therethrough, and as shown in FIG. 1, outlet flow control valve 66 is pneumatically operated, although it would be apparent to those skilled in the art that that valve could also be operated electrically or hydraulically, if desired. Additionally, clamp cylinder reservoir 50 includes an hydraulic fluid level sensor 68 that is adapted to continuously sense the level of the hydraulic fluid in clamp cylinder reservoir 50 and to provide an output signal representative of that hydraulic fluid level.

Stationary platen 16 also carries a pair of breakaway cylinders 70, 72 to assist in separating mold sections 20 and 24 after a completion of a molding cycle, and to assist traverse cylinders 28 and 30 to overcome the inertia of and to move the heavy movable platen 18 and large ram 52 toward the right as viewed in FIG. 1, as well as to push the large volume of hydraulic fluid from within clamp cylinder 48 into clamp cylinder hydraulic reservoir 50. Breakaway cylinders 70, 72 have respective rod end conduits 74, 76 to provide pressurized fluid for separating the mold portions, and include respective head end conduits 78, 80 for permitting the flow of hydraulic fluid from the head ends of the respective cylinders into and out of clamp cylinder reservoir 50.

The hydraulic circuit for operating the various elements of the illustrated mold clamping arrangement includes an hydraulic pump 82 that is driven by an electric motor 84, or the like, to provide pressurized hydraulic fluid for the several hydraulic cylinders disclosed. Specifically, the pump includes an output conduit 86 that is connected to claim cylinder 48 by means of a pressurizing conduit 88 that includes a clamp cylinder pressurizing flow control valve 90. Similarly, pump output conduit 86 is also connected with the head and rod ends of the respective traverse cylinders 28 and 30 through a traverse cylinder directional flow control valve 92. Additionally, breakaway cylinders 70 and 72 are similarly connected to pump output conduit 86 through flow control valve 94, and prefill valve 54 is similarly connected thereto through a directional flow control valve 96. The control arrangements for controlling the operation of the respective directional and flow control valves are well known to those having skill in the art.

Second stationary platen 16 also carries a position transducer 98 for continuously sensing the position of movable platen 18, and for providing a signal representative of that position to a comparator 100, which also receives the output signal from level sensor 68, for purposes to be hereinafter explained.

In operation, initially mold sections 20 and 24 are spaced from each other, as shown in FIG. 1, and the mold closing portion of the operating cycle is initiated by opening prefill valve 54 by shifting directional flow control valve 96 to provide pressurized fluid through conduit 62 to the head end of prefill valve cylinder 58 to cause prefill valve 54 to open. Pressurized hydraulic fluid is also provided to the head ends of each of traverse cylinders 28 and 30 by operating directional flow control valve 92 to provide communication between pump 82, through pump output conduit 86, and head end conduits 40 and 44. At the same time, flow control valve 94 for breakaway cylinders 70 and 72 is positioned to permit return to main reservoir 52 of hydraulic that is contained in the respective rod ends of each of those cylinders.

As pistons 32 and 34 in traverse cylinders 28 and 30, respectively, move movable platen 18 toward the left as viewed in FIG. 1, hydraulic fluid flows, both by gravity and by virtue of the lower pressure within cylinder 48 resulting from the outward movement of ram 52, from clamp cylinder hydraulic reservoir 50, through open prefill valve 54 and into clamp cylinder 48 to fill the space that is created as ram 52 moves outwardly from clamp cylinder 48 toward first stationary platen 14. When mold sections 20 and 24 are in contacting relationship, and ram 52 has reached its fully extended position, prefill directional flow control valve 96 is shifted so that pressurized fluid is provided through conduit 62 to the rod end of prefill valve cylinder 58 to close prefill valve 54 and thereby close off the interior of clamp cylinder 48.

Clamping force is provided between the closed mold portions by shifting clamp cylinder pressurizing valve 90 to permit pressurized fluid form pump output conduit 86 to flow through conduit 88 and into clamping cylinder 48 to raise the pressure therewithin, and thereby to increase the clamping force holding mold sections 20 and 24 together. When the desired level of clamping force has been achieved, clamp cylinder pressurizing valve 90 is closed to maintain the desired pressure level within clamp cylinder 48, and molding material is injected into the mold cavity by a suitable pressurized material injection system (not shown), the structure and operation of which are well known to those skilled in the art.

Upon conclusion of the molding operation, after the material in the mold cavity has solidified sufficiently, pressure in clamp cylinder 48 is relieved by passing a small volume of hydraulic fluid through conduit 104 by opening decompression valve 106 to allow flow through conduit 108 to clamp system reservoir 50. Breakaway cylinder control valve 94 is then operated to provide hydraulic pressure through conduits 74 and 76 to the rod ends of respective breakaway cylinders 70 and 72, and prefill directional flow control valve 96 is shifted to provide pressurized fluid at the head end of prefill valve cylinder 58 to cause prefill valve 54 to open. Additionally, pressurized hydraulic fluid is also introduced through conduits 44 and 46 into the rod ends of respective traverse cylinders 28 and 30, through the operation of traverse cylinder directional flow control valve 92, to provide additional force to cause the movable platen to shift from left to right, as viewed in FIG. 1, whereupon the hydraulic fluid from clamp cylinder 48 is pushed by ram 52 from clamp cylinder 48, through prefill valve 54, and into clamp cylinder hydraulic reservoir 50. Because of the additional fluid that is introduced into clamp cylinder 48 during the pressurization step to provide the desired high clamping force, the quantity of hydraulic fluid contained within clamp cylinder hydraulic reservoir 50 after a molding operation is greater than the quantity of fluid therein at the commencement of the operating cycle.

Figure 2:
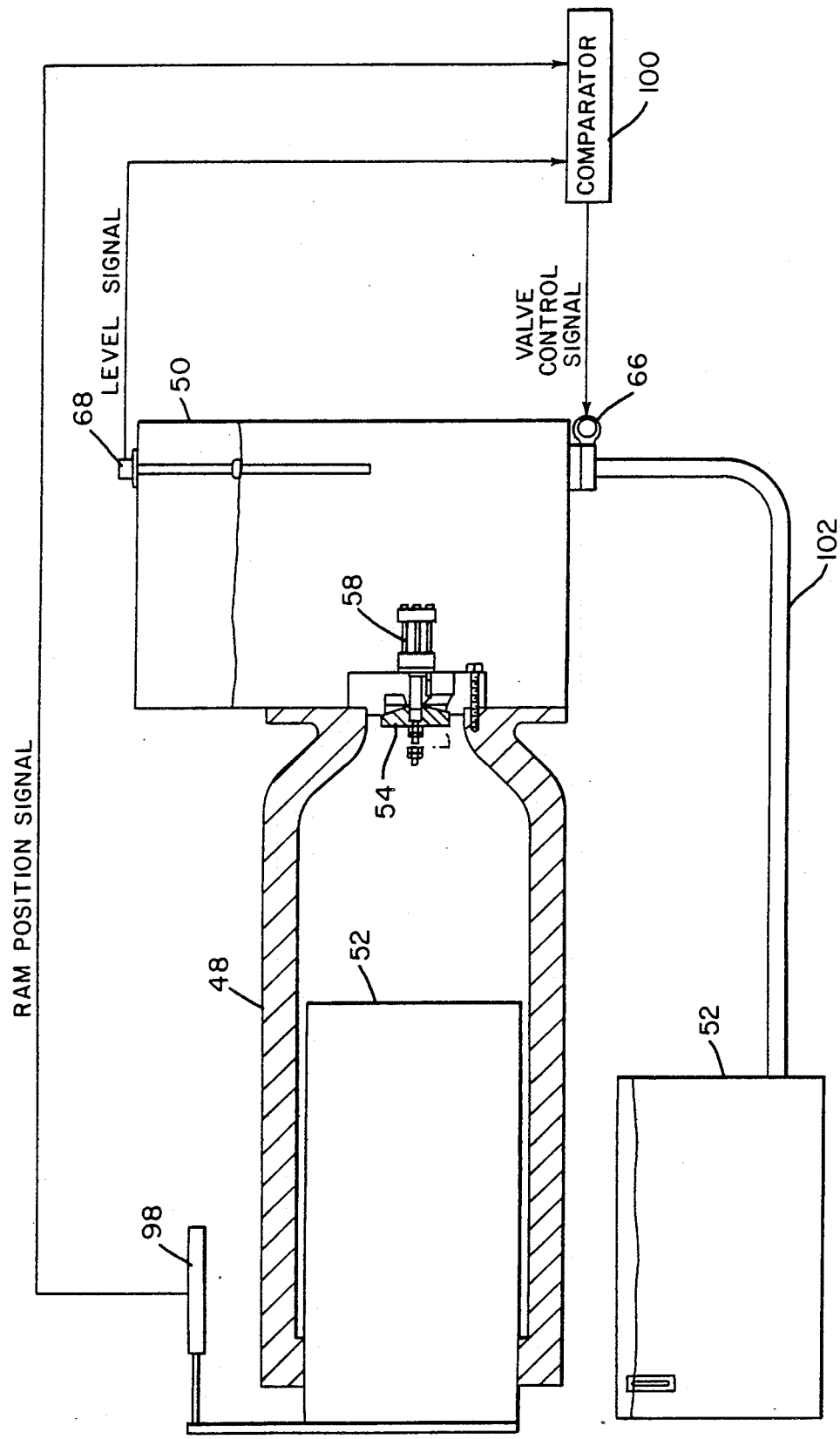
FIG. 2 is an enlarged, fragmentary, cross-sectional view showing the clamping cylinder, the clamping reservoir, and the main hydraulic reservoir of the molding machine shown in FIG. 1.

The fluid level within clamp cylinder hydraulic reservoir 50 is continuously sensed by level sensor 68, which provides an output signal to comparator 100 (see FIG. 2), which also receives an output signal from position transducer 98. If the fluid level within clamp cylinder hydraulic reservoir 50 is higher than would be expected based upon the position of ram 52, as sensed by position tranducer 98, a control signal is provided by comparator 100 to actuate overflow control valve 66, and to permit a portion of the fluid within reservoir 50 to flow through overflow conduit 102 and into main hydraulic fluid reservoir 52. As a result, the overall volume of clamp cylinder hydraulic reservoir 50 need not be significantly greater than the change in volume of hydraulic fluid entering clamp cylinder 48 during an operating cycle, which permits clamp cylinder hydraulic reservoir 50 to be confined to a reasonable height in order not to extend the overall height of the machine such that it can only be accommodated within a high bay structure.

As will be apparent, if the normal practice followed in small capacity molding machines of providing a single hydraulic fluid reservoir is employed with a large capacity molding machine, wherein the single reservoir is normally positioned above the clamping cylinder to permit gravity flow of hydraulic fluid thereinto, the resulting high volume hydraulic fluid reservoir would greatly increase the height of the machine, and would thereby limit the types of buildings in which such large machines can be used. However, by employing the multiple reservoir arrangement disclosed herein, the size of the hydraulic reservoir for containing fluid for the clamping cylinder can be maintained at a reasonably low volume, and consequently result in a machine having a much lower overall machine height. A molding machine incorporating such a multiple reservoir arrangement can therefore be accommodated in buildings having lower ceiling heights than would otherwise be required. Additionally, the arrangement disclosed herein provides protection from overflowing of a clamp cylinder hydraulic reservoir.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A molding machine clamp system for molding machines that mold articles from a flowable molding material that is introduced under pressure into a closed mold cavity, said clamp system comprising:
    (a) mold traversing means for moving a first mold section relative to a second mold section, the mold sections together defining a mold cavity;
    (b) hydraulically operated mold clamping means for providing a clamping force for holding the first and second mold sections together in contacting relationship during injection into the mold cavity of pressurized molding material, the clamping means includiung a clamp cylinder and a ram member movable within the cylinder for providing clamping force;

(c) a first hydraulic fluid reservoir for containing a quantity of hydraulic fluid for operating hydraulically operated components of the mold traversing means; and (d) a second hydraulic fluid reservoir positioned at a higher elevation than the first reservoir and connected with the first reservoir through a connecting conduit to permit excess hydraulic fluid above a predetermined fluid level in the second reservoir to flow from the second reservoir to the first reservoir, the second reservoir having a hydraulic fluid capacity to provide a sufficient volume of hydraulic fluid only for operating the mold clamping means.

2. A molding machine clamp system in accordance with claim 1, wherein the hydraulically operated mold clamping means includes pressurizing means for adding pressurized hydraulic fluid to the clamp cylinder for increasing the clamping force holding the mold sections together during injection of pressurized molding material into the mold cavity.

3. A molding machine clamp system in accordance with claim 2, wherein the second reservoir includes level sensing means for providing an output signal representative of hydraulic fluid level within the second reservoir, and overflow valve means in the connecting conduit and operable in response to the output signal of the level sensing means for permitting any excess hydraulic fluid in the second reservoir above a predetermined level to flow from the second reservoir to the first reservoir.

4. A molding machine clamp system in accordance with claim 3, including position sensing means connected with the mold traversing means for providing an output signal representative of ram member position within the clamp cylinder, and comparator means for comparing the output signal from the level sensing means with the ram member position signal and for providing a control signal for opening the overflow valve means when the level signal is greater than a predetermined level corresponding with a given position of the ram member, to permit hydraulic fluid to flow from the second reservoir to the first reservoir.

5. A molding machine clamp system in accordance with claim 1, including prefill valve means positioned between and providing communication between the clamp cylinder and the second reservoir for selectively permitting rapid flow of hydraulic fluid flow between the clamp cylinder and the second reservoir.

6. A molding machine clamp system in accordance with claim 5, including pressurizing means for adding pressurized hydraulic fluid to the clamp cylinder while the prefill valve means is closed, for increasing the clamping force holding the mold sections together during injection of pressurized molding material into the mold cavity.

7. A molding machine clamp system in accordance with claim 6, wherein the second reservoir includes level sensing means for providing an output signal representative of hydraulic fluid level within the second reservoir, and overflow valve means in the connecting conduit and operable in response to the output signal of the level sensing means for permitting hydraulic fluid in the second reservoir above a predetermined level to flow from the second reservoir to the first reservoir.

8. A molding machine clamp system in accordance with claim 7, including position sensing means connected with the mold traversing means for providing an output signal representative of ram member position within the clamp cylinder, and comparator means for comparing the output signal from the level sensing means with the ram member position signal and for providing a control signal for opening the overflow valve means when the level signal is greater than a predetermined level corresponding with a given position of the ram member, to permit hydraulic fluid to flow from the second reservoir to the first reservoir.

* * * * *